(12) United States Patent
Chidlovskii et al.

(10) Patent No.: US 9,519,912 B2
(45) Date of Patent: Dec. 13, 2016

(54) HYBRID SYSTEM FOR DEMAND PREDICTION

(71) Applicant: Xerox Corporation, Norwalk, CT (US)

(72) Inventors: Boris Chidlovskii, Meylan (FR); Mohammad Ghufran, Lahore (PK)

(73) Assignee: XEROX CORPORATION, Norwalk, CT (US)

( * ) Notice: Subject to any disclaimer, the term of this patent is extended or adjusted under 35 U.S.C. 154(b) by 278 days.

(21) Appl. No.: 14/032,476

(22) Filed: Sep. 20, 2013

(65) Prior Publication Data

US 2015/0088790 A1 Mar. 26, 2015

(51) Int. Cl.
*G06F 15/18* (2006.01)
*G06Q 30/02* (2012.01)
*G06N 99/00* (2010.01)
*G06Q 10/06* (2012.01)

(52) U.S. Cl.
CPC ........ *G06Q 30/0202* (2013.01); *G06N 99/005* (2013.01); *G06Q 10/0631* (2013.01)

(58) Field of Classification Search
None
See application file for complete search history.

(56) References Cited

U.S. PATENT DOCUMENTS

| 2011/0251807 | A1* | 10/2011 | Rada et al. | 702/61 |
| 2011/0302111 | A1* | 12/2011 | Chidlovskii | 706/12 |
| 2012/0226651 | A1* | 9/2012 | Chidlovskii | 706/52 |
| 2013/0117077 | A1* | 5/2013 | Li et al. | 705/13 |
| 2013/0179383 | A1* | 7/2013 | Pringle et al. | 706/46 |
| 2013/0317884 | A1* | 11/2013 | Chidlovskii | 705/7.31 |
| 2014/0058711 | A1* | 2/2014 | Scofield | 703/6 |
| 2014/0089036 | A1* | 3/2014 | Chidlovskii | 705/7.27 |
| 2014/0280232 | A1* | 9/2014 | Chidlovskii | 707/749 |
| 2014/0288982 | A1* | 9/2014 | Chidlovskii | 705/6 |
| 2015/0088790 | A1* | 3/2015 | Chidlovskii et al. | 706/12 |
| 2015/0186792 | A1* | 7/2015 | Chidlovskii | 706/12 |

OTHER PUBLICATIONS

Yang et al., "Localized Support Vector Regression for Time Series Prediction", 2009, Neurocomputing, vol. 72, pp. 2659-2669.*

(Continued)

*Primary Examiner* — Paulinho E Smith
(74) *Attorney, Agent, or Firm* — Fay Sharpe LLP

(57) ABSTRACT

In demand prediction, a history of demand for a resource is modeled to generate a baseline model of the demand, and demand for the resource at a prediction time is predicted by evaluating a regression function of depth k operating on an input data set including at least the demand for the resource at the prediction time output by the baseline model and measured demand for the resource measured at k times prior to the prediction time. The resource may be off-street parking, and the input data set may further include weather data. The regression function may comprise a support vector regression (SVR) function that is trained on the history of demand for the resource. The baseline model suitably comprises a Fourier model of the history of demand for the resource.

20 Claims, 13 Drawing Sheets

(56) References Cited

OTHER PUBLICATIONS

Caicedo et al, "Prediction of Parking Space Availability in Real Time", 2012, Expert Systems with Applications, vol. 39, pp. 7281-7290.*

Fumi et al., "Fourier Analysis for Demand Forecasting in a Fashion Company", Jun. 15, 2013, International Journal of Engineering Business Management, vol. 5, pp. 1-10.*

Omitaomu et al., "On-Line Prediction of Motor Shaft Misalignment Using Fast Fourier Transform Generated Spectra Data and Support Vector Regression", Nov. 2006, Journal of Manufacturing Science and Engineering, vol. 128, pp. 1018-1024.*

McSharry et al., "Probabilistic Forecasts of the Magnitude and Timing of Peak Electricity Demand", May 2005, IEEE Transaction on Power Systems, vol. 20 No. 2, pp. 1166-1172.*

Felix Caicedo, "The Use of Space Availability Information in "PARC" Systems to Reduce Search Times in Parking Facilities", 2009, Transportation Research Part C, vol. 17, pp. 56-68.*

Le, et al. "Learning nonlinear hybrid systems: from Sparse Optimization to Support Vector Regression", HSCC—$16^{th}$ Intl Conf. on Hybrid Systems: Computation and Control, 2013, pp. 1-10.

Mu, et al. "A weighted voting and sequential combination of Classifiers Scheme and Human Face Recognition" CVPR 2005, pp. 1-7.

Sapankevych, et al. "Time Series Prediction Using Support Vector Machines: a Survey", IEEE 4.2 Computational Intelligence Magazine, 2009, 24-38.

Smola, et al. "A tutorial on support vector regression" Statistics and computing 14.3, 2004, 199-222.

* cited by examiner

HYBRID SYSTEM FOR DEMAND PREDICTION

BACKGROUND

The following relates to the demand prediction arts such as off-street parking demand prediction, predictive modeling of time series data, and related arts.

Some illustrative examples of demand prediction problems include predicting demand for off-street parking, predicting demand for a commercial product (e.g. gasoline, electrical power, a retail merchandise product), and so forth. Typically, such demand follows certain discernible patterns. For example, demand for off-street parking can be expected to exhibit daily cycles (e.g., parking usage as measured by parking ticket issuances may be expected to be highest in the morning as commuters arrive and lower during the day, with the lowest usage the midnight-early a.m. time interval) weekly cycles (e.g. high parking usage during the workweek and lower usage on weekends, or vice versa for parking facilities that mostly service weekend clientele), and longer seasonal cycles (e.g., a parking facility that services a university may be heavily used when the university is in session and lightly used between sessions).

By recognizing such cycles, a parking lot operator can plan ahead in terms of scheduling parking lot attendants for work, optimizing parking prices based on predicted demand, and so forth. Additionally, the parking lot operator may take known special events into account, for example a parking facility located near a football stadium may be expected to see heavy usage just prior to a football game held at the stadium.

BRIEF DESCRIPTION

In some embodiments disclosed herein, a non-transitory storage medium stores instructions readable and executable by an electronic data processing device to perform a method comprising: estimating demand for a resource at a prediction time based on a harmonic analysis of a history of the demand; and generating a prediction of demand for the resource at the prediction time by evaluating a predictor function operating on an input data set including at least the estimated demand for the resource at the prediction time estimated based on the harmonic analysis and measured demand for the resource measured at one or more times prior to the prediction time. The resource may, for example, be off-street parking, electrical power, gasoline, or a retail merchandise product. In some embodiments the predictor function comprises a support vector regression (SVR) function trained on the history of the demand. In some embodiments the method further comprises generating a Fourier model of the history of the demand, for example by computing Fourier components for different periods including at least two of (1) one day, (2) one week, and (3) one year, or by computing a Fourier transform of the history of the demand, and the estimating comprises estimating demand for the resource at the prediction time by evaluating the Fourier model at the prediction time.

In some embodiments disclosed herein, an apparatus comprises an electronic data processing device configured to receive occupancy data from an off-street parking resource, the electronic data processing device further configured to: estimate demand for the off-street parking resource at a prediction time based on a model of historical occupancy data received from the off-street parking resource; and generate a predicted demand for the off-street parking resource at a prediction time by evaluating a regression function operating on an input data set including at least the estimated demand for the off-street parking resource at the prediction time estimated based on the model and occupancy data received from the off-street parking resource at k times prior to the prediction time. The input data set may further include weather data measured at the k times prior to the prediction time. The regression function may comprise a SVR function trained on the historical occupancy data. The electronic data processing device may be further configured to generate said model as a Fourier model of the historical occupancy data, for example by operations including computing a Fourier component for a time interval of one day and computing a Fourier component for a time interval of one week.

In some embodiments disclosed herein, a method comprises modeling a history of demand for a resource to generate a baseline model of the demand, and predicting demand for the resource at a prediction time by evaluating a regression function of depth k operating on an input data set including at least the demand for the resource at the prediction time output by the baseline model of the demand and measured demand for the resource measured at k times prior to the prediction time, where k is a positive integer greater than or equal to one. The modeling and the predicting are suitably performed by an electronic data processing device. In some embodiments k is greater than or equal to two. In some embodiments the resource is off-street parking and the input data set further includes weather data measured at the one or more times prior to the prediction time. In some embodiments the method further comprises training the regression function, such as an SVR function, on the history of demand for the resource, wherein the training is performed by the electronic data processing device and utilizes the baseline model of the demand. In some embodiments the baseline model comprises a Fourier model, and the modeling comprises computing Fourier components of the history of demand for the resource.

DETAILED DESCRIPTION

Figure 1:
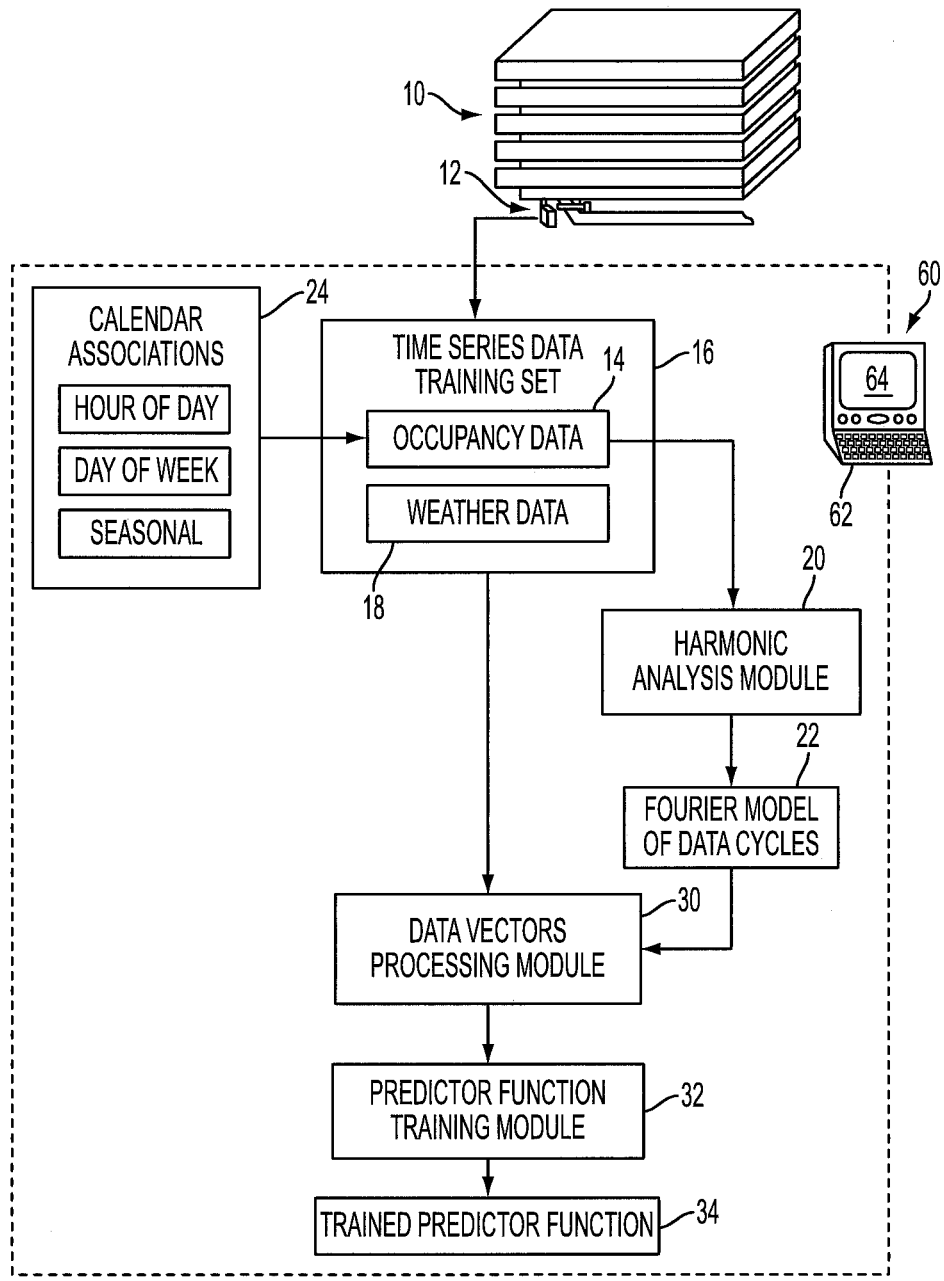
FIGS. 1 and 2 diagrammatically show a system for performing regression analysis of countable data, including a diagrammatic representation of the learning phase of the regression analysis (FIG. 1) and a diagrammatic representation of the inference phase (FIG. 2).

Demand for products or services such as off-street parking is expected to follow certain cyclical patterns, possibly modified by specific discernible events such as sports events in the case of a stadium parking lot. However, it is recognized herein that cycle-based demand prediction (even augmented by taking into account recognizable special events) may not provide sufficiently accurate demand prediction, especially in mid- to short-term time intervals. Considering off-street parking demand as an illustrative example, the demand may be impacted by other factors such as weather conditions, less significant special events (e.g. in the case of a city parking lot, it may be difficult to know about, and/or predict the effect on parking demand of, a small conference held some distance from the parking lot), current gasoline prices, and so forth. Failure to account for such latent factors can adversely impact parking lot profitability and operational efficiency through non-optimal pricing and inefficient scheduling of parking lot attendants.

It is disclosed herein to improve prediction of demand for a resource at a prediction time by estimating the demand based on a harmonic analysis of a history of the demand, and then generating a prediction of demand for the resource at the prediction time by evaluating a predictor function operating on an input data set including at least the demand for the resource at the prediction time estimated based on the harmonic analysis and measured demand for the resource measured at one or more times prior to the prediction time. In this way, the demand estimate generated by harmonic analysis is adjusted for shorter term variations using the predictor function, while still leveraging the harmonic analysis estimate which is expected to be typically relatively accurate.

The resource can be, by way of non-limiting illustrative example: off-street parking, electrical power, gasoline, a retail merchandise product, or so forth. By way of illustration, a system for predicting demand for an off-street parking resource is described. Off-street parking facilities are commonly constructed in high activity areas or near high activity locations, such as airports, shopping malls, recreation areas, downtowns or other commerce centers, and so forth. Use of parking facilities by drivers is affected by various internal and external factors, and identifying and incorporating this information is advantageous for understanding decisions made by drivers. Another factor that may impact use of a parking resource is the pricing. The price for parking is typically a function of the time duration of use (e.g., a certain price per hour) and may also be a function of the time-of-day (e.g., an "early bird special" for parkers who arrive early). The prices that a particular parking facility can charge are impacted by the proximity to points of interest, overall availabilty and demand for parking in the locale, and so forth.

In the disclosed demand prediction for an off-street parking resource, the goal is predict the parking demand based on a model incorporating historical occupancy data and other available observations. The demand prediction can serve diverse useful purposes, such as optimizing pricing to maximize profit, maximizing availability of parking spaces, providing a principled basis for parking lot attendant work shift scheduling, and so forth. These applications may be interweaved: for example, adjusting the pricing based on the occupancy predictions can cause modifications in driver behavior leading to reduction in traffic congestion and increase availability of the limited parking resources during peak hours. The disclosed demand prediction incorporates historical data and optionally other aspects which may impact the demand, such as seasonal effects, calendar information (e.g. day-of-week, time-of-day, et cetera), weather conditions, status of adjacent sub-systems (rail, buses or flights), and so forth.

The historical data of parking occupancy is suitably represented as a time series, and may be modeled using various approaches such as machine learning techniques (e.g. support vector regression, SVR), auto-regressive models like auto-regressive integrated moving average (ARIMA), spectral methods like harmonic decomposition, neural networks, regression trees, k-nearest neighbors, Gaussian processes, and so forth. The disclosed demand prediction operates over a range of time horizons. Short-term prediction on the order of minutes or hours can be useful for real-time management of parking resources. On the other hand, long-term prediction on the order of days, weeks, or months is of value for longer-term planning, such as hiring parking lot attendants, scheduling parking facility renovations, and so forth.

As disclosed herein, the goals of short-term versus medium-term versus long-term prediction of off-street parking demand are difficult to simultaneously satisfy using any one predictor function. Accordingly, in some embodiments demand for the off-street parking resource at a prediction time is estimated based on a model of historical occupancy data received from the off-street parking resource (which tends to provide a baseline accurate in the longer term), and the demand for the off-street parking resource at a prediction time is predicted by evaluating a regression function operating on an input data set including at least the demand at the prediction time estimated based on the model and occupancy data received from the off-street parking resource at k times prior to the prediction time. The adjustment by regression of depth k corrects for shorter-term deviations from the historical patterns captured by the model. The model may, for example, be generated using harmonic analysis generating a Fourier model comprises computing Fourier components for a plurality of different periods, such as a Fourier component with a period of one day, a Fourier component with a period of one week, and/or a Fourier component with a period of one year. It is also contemplated to employ a Fourier transform, e.g. implemented as a fast Fourier transform (FFT) or other discrete Fourier transform (DFT), as the baseline model. A Fourier transform approach generates the Fourier components as a function of frequency. The predictor function may, for example, comprise a support vector regression (SVR) function of depth k trained on the history of the demand. Other predictor function embodiments are alternatively contemplated, such as a predictor function embodied as a neural network, a regression tree, a k-nearest neighbors regressor, a Gaussian mixture model (GMM), or so forth, operating on an input data set including at least the demand at the prediction time estimated based on the model and occupancy data received from the off-street parking resource at k times prior to the prediction time.

With reference to FIG. 1, an illustrative off-street parking resource 10 comprises a multi-level parking garage. More generally, the off-street parking resource may be a single- or multi-level parking garage, a surface parking lot, metered curbside parking, various combinations thereof, or so forth. The off-street parking resource includes a mechanism 12 for tracking occupancy of the off-street parking resource 10. The occupancy may be measured directly. The illustrative tracking mechanism 12 is a ticket gate located at the entrance to the parking facility. In this approach, a driver approaching the entrance is stopped by a lift-bar of the ticket gate, the driver obtains a parking ticket from the ticket gate, and this process causes the lift-bar to automatically rise to admit the vehicle into the parking garage. It is assumed the vehicle parks, and therefore occupies the garage until leaving. A similar arrangement can be provided at the parking garage exit, with vehicle exodus from the parking garage being detected by a suitable payment gate at the exit, operating automatically, or by a (human) gate attendant. The occupancy is then the time-aggregated value of (vehicle admittances-minus-vehicle exits), with occupancy recorded on a chosen time basis, e.g. each hour, or in fifteen minute intervals, or so forth.

In some embodiments, recordation of vehicles entering the parking facility 10 via the entrance gate 12 is used as the occupancy metric, with the duration of stay in the facility being neglected. This approach is well-suited for parking resources that are closed at night, e.g. day parking facilities or evening event parking facilities, where it may be expected that most vehicles will stay until closing.

These are merely illustrative examples, and other approaches for tracking occupancy are contemplated, such as measuring time-in-operation of parking meters in the case of metered parking (e.g., occupancy equals the fraction of parking meters that do not have "time expired" status).

The output of the tracking mechanism 12 of the off-street parking resource 10 is a time series of data. FIG. 1 illustrates the training of the demand prediction model, and accordingly the off-street parking resource occupancy data define the occupancy data component 14 of a time series data training set 16, which may also include other relevant data such as illustrative weather data 18, or other relevant data such as gasoline prices, et cetera. The occupancy is suitably represented by values y. The goal of time series prediction is to estimate value y at time i based on past values at time i−1, i−2, . . . . For the regression analysis, the analysis may be limited in depth to the last k values (lag). Moreover, the time series prediction can also take into account a number of external characteristics $v_i$ at time i which may have impact on the series values, such as the illustrative weather data 18. The objective of the time series prediction is to find a function $\hat{y}_i = f(x_i)$, where $x_i = (v_{i,1}, \ldots, v_{i,m}, y_{i-k}, \ldots, y_{i-1})$ is an input data set, such that $\hat{y}_i$, the predicted value of the time series at a future point in time, is consistent and minimize a regularized fit function. In the input data set $x_i$, which may be written as a vector for mathematical convenience, the terms $v_{i,1}, \ldots, v_{i,m}$ are relevant characteristics at time i, such as (in the case of off-street parking) weather, gasoline price, and/or so forth. Moreover, the lag can also include some lag offset δ to take into account that the most recent values may be unavailable at the time of prediction. With a lag offset $\delta \geq 0$, the input data may be written as $x_i = (v_{i,1}, \ldots, v_{i,m}, y_{i-k-\delta}, \ldots, y_{i-1-\delta})$.

With continuing reference to FIG. 1, the occupancy data 14 of the training set 16 is input to a harmonic analysis module 20 to generate the baseline model of the demand. In illustrative examples herein, the harmonic analysis module 20 performs Fourier series analysis to decompose the occupancy data 14 into a sum of a series of cosine and sine terms or, equivalently, into terms of the form $A \cdot \cos(\omega x + \phi)$ where A is an amplitude, ω is an angular frequency, and ϕ is a phase. Each term is defined by a unique amplitude A and a phase angle ϕ, where the amplitude value is half the height of the corresponding wave, and the phase angle (or simply, phase) defines the offset between the origin and the peak of the wave over the range 0 to 2π. In one suitable formulation with $f(x)$ being a continuous function on an interval [0, L], the Fourier series representation for $f(x)$ can be written as:

$$f(x) = \sum_{n=1}^{\infty} \left( a_n \cos\frac{2\pi n x}{L} + b_n \sin\frac{2\pi n x}{L} \right) + \frac{1}{2}a_0. \quad (1)$$

where in this formulation the $a_n$ and $b_n$ are amplitudes of the cosine and sine components, with the phase being related to these terms (e.g. if $a_n$ is positive and $b_n = 0$ then the phase is 0°; if $b_n$ is positive and $a_n = 0$ then the phase is 90°; and so forth). By the orthogonality properties of sine and cosine, Equation (1) can be manipulated to yield the following equations for $a_n$ and $b_n$, the coefficients of the Fourier series:

$$a_n = \frac{2}{L}\int_0^L f(x)\cos\frac{2\pi n x}{L} dx \text{ for } n \geq 0, \quad (2)$$

-continued $$b_n = \frac{2}{L}\int_0^L f(x)\sin\frac{2\pi n x}{L} dx \text{ for } n \geq 0. \quad (3)$$

Additionally, $b_0 = 0$ is set, and $a_0/2 = 1/L\int_0^L f(x)dx$, which is the average value of $f(x)$ over the interval [0, L]. Given a finite data series {y(k); k=1, . . . , N} instead of the continuous function $f(x)$, a suitable approximation is the trapezoid approximation for $a_j$ and $b_j$, as follows:

$$a_j = \frac{1}{N-1}\left( y(1) + y(N) + 2\sum_{k=2}^{N-1} y(k)\cos\frac{2\pi j(k-1)}{N-1} \right) \text{ for } j \geq 0, \quad (4)$$

$$b_j = \frac{2}{N-1}\sum_{k=2}^{N-1} y(k)\sin\frac{2\pi j(k-1)}{N-1} \text{ for } j \geq 1. \quad (5)$$

In this discretized formulation, the frequency is given by the term 2πj.

The harmonic analysis module 20 generates a Fourier model 22, which is expected to capture repetitive data cycles. In off-street parking resource demand prediction, these cycles are typically expected to correspond to calendar associations 24 such as hourly cycles, daily cycles, weekly cycles, seasonal (e.g. yearly) cycles, or so forth. (This is also true of many other types of demand prediction problems, such as prediction of electrical power usage, retail sales, and so forth). Accordingly, the occupancy data 14 are tagged with the calendar associations 24, and Equations (4) and (5) are evaluated for frequency values corresponding to a plurality of different periods, typically including at least two of, and preferably all three of: one day (to capture cycles over a 24 hour period); one week (to capture weekly cycles), and one year (to capture seasonal cycles). This entails evaluating the coefficient terms $a_j$, $b_j$ for values for the term j corresponding to these periods and integer multiples thereof. The seasonal analysis is more effective when data for a complete year (or more) is available and a similar sized data set is available as a test set.

With continuing reference to FIG. 1, a data vectors processing module 30 constructs an input data set, suitably written as a vector, for each occupancy training datum of the time series training data set 16. For occupancy datum $y_i$ at time i, the input data set is suitably of the form $x_i = (y_i^H, v_{i,1}, \ldots, v_{i,m}, y_{i-k-\delta}, \ldots, y_{i-1-\delta})$ where $y_{i-k-\delta}, \ldots, y_{i-1-\delta}$ are the occupancy values of the occupancy data 14 previous to time i to depth k (with optional lag offset δ), $v_{i,1}, \ldots, v_{i,m}$ are relevant characteristics at time i (e.g. weather in the illustrative example, more generally the terms may be omitted entirely in some embodiments), and $y_i^H$ is the occupancy at time i as predicted by the Fourier model 22 or other baseline model generated by the harmonic analysis module 20. The set of data $(x_i, y_i)$, i=1, . . . , n form the training data input to a predictor function training module 32 that trains a predictor function operating on the input data set $x_i$ including at least the estimated demand $y_i^H$ for the resource at the prediction time i estimated based on the harmonic analysis and measured demand $y_{i-k-n}, \ldots, y_{i-1-n}$ for the resource measured at one or more times prior to the prediction time i. The predictor function may be a regression function such as a support vector regression (SVR) function. The output of this training is a trained predictor function 34 for use in demand prediction.

Figure 2:
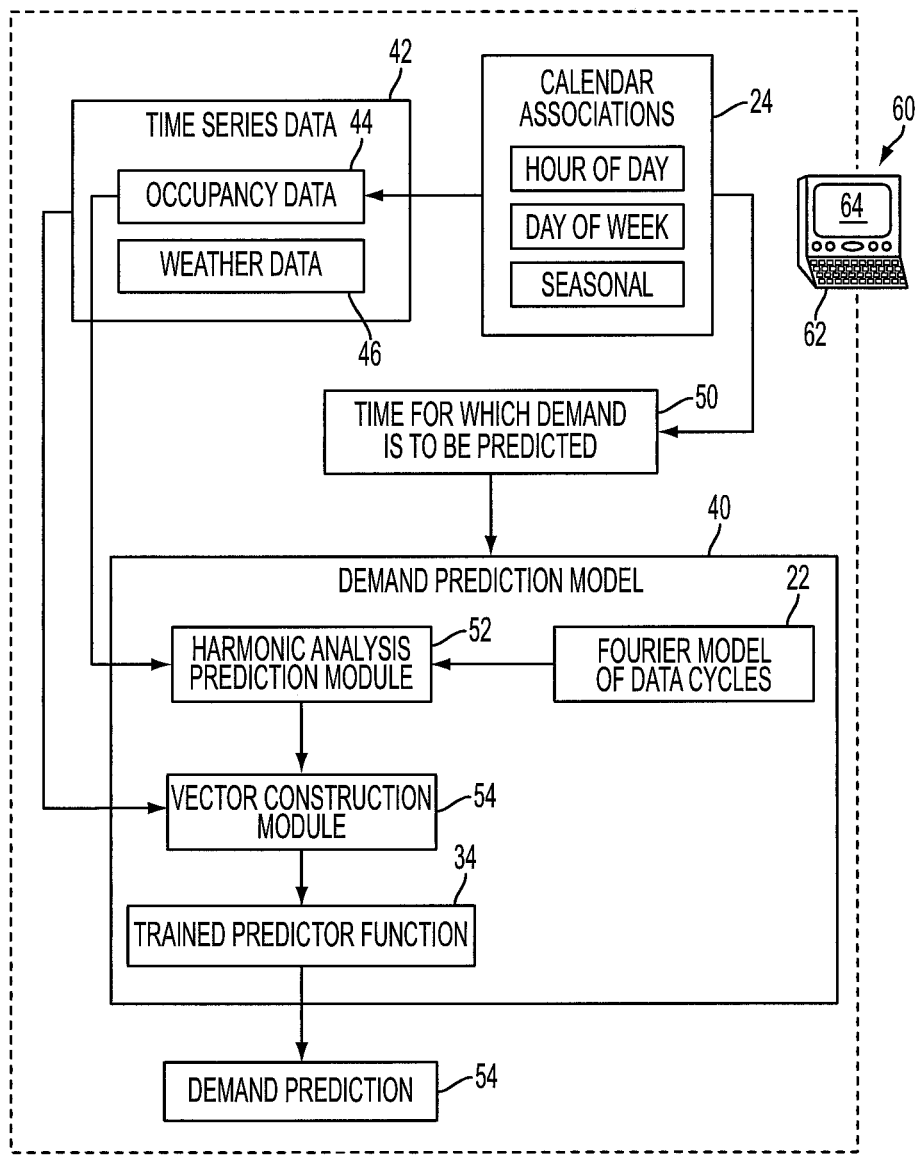

With reference to FIG. 2, a demand prediction system 40, which has been trained as described with reference to FIG. 1, receives time series data 42 comprising occupancy data 44 and optional corresponding relevant data such as illustrative weather data 46. The demand prediction system 40 operates to predict the demand $y_i$ at a time i 50 for which occupancy values previous to time i to depth k with optional lag offset δ are included in the available data 40. A harmonic analysis prediction module 52 applies the Fourier model 22 to generate a baseline demand prediction $y_i^H$. A vector construction module 54 then operates analogously to the data vectors processing module 30 of the training phase (FIG. 1) to generate an input data vector $x_i=(y_i^H, v_{i,1}, \ldots, v_{i,m}, y_{i-k-\delta}, \ldots, y_{i-1-\delta})$, where $y_{i-k-\delta}, \ldots, y_{i-1-\delta}$ are the occupancy values of the occupancy data 44 previous to the time i 50 for which the prediction is to be made, to depth k with optional lag offset δ. The values $v_{i,1}, \ldots, v_{i,m}$, are relevant characteristics at prediction time i 50 (e.g. weather in the illustrative example), and baseline demand prediction $y_i^H$ output by the harmonic analysis prediction module 52. The trained predictor function 34 generated by the training phase operates on this vector $x_i$ to generate the demand prediction 54.

In operation, the training phase (FIG. 1) and the inference or prediction phase (FIG. 2) are performed in an alternating fashion. For example, in one approach, an initial training phase performed as described with reference to FIG. 1 is performed on historical data 16 for parking occupancy of the off-street parking resource 10 to generate the initial baseline model 22 and trained predictor function 34. Thereafter, this trained system is used to predict demand for the off-street parking resource 10 as per the prediction system described with reference to FIG. 2. The system may in general be used to predict parking demand on a time horizon of hours, days, weeks, or longer. After some time, e.g. once every week, the system reverts to the training phase to update the model (i.e. the baseline model 22 and the predictor function 34). In some embodiments, only training of the predictor function 34 is updated on a weekly (or other relatively frequent) basis, with the baseline model 22 being updated less frequently (e.g., on a per-year basis). Moreover, it is contemplated for updating of the model to be performed based on accuracy feedback rather than (or in addition to) a regular, e.g. weekly, update schedule. For example, accuracy of the predicted demand $\hat{y}_i$ can be determined when time i arrives and the actual demand $y_i$ is measured. Thus, an error metric such as $|\hat{y}_i - y_i|$ can be monitored, and when this error is too large (in some statistical sense over some sliding time window) then an update is performed.

In system operation, the baseline model 22 captures the historical trends of daily, weekly, or seasonal cycles, while the trained predictor function 34 provides real-time adjustments for deviations from historical trends. It is contemplated to train two or more predictor functions with different depths k and/or with different lag offsets δ for use in predictions over different time horizons. For example, a predictor may be trained with no lag offset (δ=0) and a small depth (e.g. k=1) to provide demand predictions on a daily basis (short horizon); whereas, demand predictions on a longer horizon, e.g. monthly, may employ a trained predictor function having a large lag offset δ corresponding to a month or a year, and a larger depth to provide smoothing. Advantageously, all such predictor functions optimized for the different time horizons utilize the same baseline model 22 and the same baseline demand prediction $y_i^H$ output by that model.

The systems of FIGS. 1 and 2 are suitably implemented by an illustrative computer 60 or other electronic data processing device. The input training data 16 and time series data 42 are suitably provided by the tracking mechanism 12 automatically, or alternatively these data may be entered manually using a keyboard 62 or other user input device. Predicted demand $\hat{y}_i$ may be displayed on a computer display 64 or other output device as numerical values, as a trend computed by running the demand prediction module 40 for each time 50 in an interval of times, or so forth. The systems of FIGS. 1 and 2 may additionally or alternatively be embodied by a non-transitory storage medium (not shown) storing instructions executable by the computer 60 or other electronic data processing device to perform the disclosed training and prediction phases of the disclosed demand prediction. The non-transitory storage medium may, for example, include one or more of the following: a hard disk or other magnetic storage medium; an optical disk or other optical storage medium; a random access memory (RAM), read-only memory (ROM), flash memory or other electronic storage medium; or so forth.

In the following, some illustrative examples of the predictor function suitably trained to generate the trained predictor function 34 are described.

In one approach, the trained predictor function 34 comprises a support vector regression (SVR) function trained on the history of the demand as follows. Given the set of time series data 16 of the form $(x_i, y_i)$, $i=1, \ldots, n$, the predictor function training module 32 defines a function $f(x)$ that (when trained) will have an output close to the predicted value for some prediction horizon. The prediction function for the linear regression is defined as $f(x)=w^T x+b$. If the data is not linear in its input space, the data x can be mapped into a higher dimension space, via a kernel function $\phi(x)$, and then the linear regression is performed in the higher dimensional feature space as $f(x)=w^T \phi(x)+b$. The goal is therefore to find optimal weights w and threshold b, as well as to define the criteria for finding an optimal set of weights.

Given training data $(x_i, y_i)$, $i=1, \ldots, n$, $x_i \in \mathbb{R}^d$, $y_i \in \mathbb{R}$, SVM first maps input vectors x onto the feature space $\Phi$ where $\phi(x) \in \Phi$ and then approximates the regression by a linear function $f(x)=w^T \phi(x)+b$. This is obtained by solving the following optimization problem in the ε-insensitive tube (see, e.g. Smola et al., "A Tutorial on Support Vector Regression", *Statistics and Computing* vol. 14 no. 3 pages 199-222 (2004)):

$$\text{minimize } \frac{1}{2}\|w\|^2 + C\sum_{i=1}^{n}(\xi_i + \xi_i^*) \qquad (6)$$

$$\text{subject to } \begin{cases} y_i - (w^T \phi(x_i) - b) \leq \varepsilon + \xi_i \\ (w^T \phi(x_i) + b) - y_i \leq \varepsilon + \xi_i^*, i = 1, \ldots, n \\ \xi_i^* \geq 0, \xi_i \geq 0, i = 1, \ldots, n \end{cases}$$

where $\xi_i, \xi_i^*$, $i=1, \ldots, n$ are slack variables, measuring the deviation from ε-insensitive tube, and C is a regularization parameter.

In another approach, the trained predictor function 34 comprises an auto-regressive integrated moving average (ARIMA) model for time series. ARIMA is a generalization of an auto-regressive moving average (ARMA) model. The model is generally referred to as an ARIMA(p, d, q) model where parameters p, d, and q are non-negative integers that refer to the order of the auto-regressive, integrated, and moving average parts of the model respectively. An ARMA (p, q) model combines an auto-regressive model of order p with a moving average process of order q, whereas an ARIMA(p, d, q) model also includes a differentiated component of order d, to handle non-stationarity, that is:

$$\phi(L)(1-L)^d y_i = \omega(L)\epsilon_i, \quad (7)$$

where L is the back-shift (or lag) operator $L^k X_i = X_{i-k}$, and $\phi$ and $\omega$ are the two polynomials for the autoregressive (AR) and moving average (MA) components, and $v_t$ is a noise.

To improve predictive accuracy, ARIMA models can be modified to take into account the periodic nature of time series data, an approach known as a multiplicative seasonal ARIMA, or SARIMA, approach. It includes weekly or quarterly dependence relations within the auto-regressive model, by proving that the time series obtained as the difference between the observations in two subsequent weeks is weakly stationary. Conceptually, this approach is premised on the expectation that similar conditions typically hold at the same hour of the day and within the same weekdays. The resulting SARIMA(p, d, q)×(P, D, Q)s model adds to the standard ARIMA a seasonal auto-regressive, a seasonal moving average, and a seasonal differential component, as follows:

$$\phi(L)\Phi(L^S)(1-L)^d(1-L^S)^D y_i = \omega(L)\Omega(L^S)\epsilon_i, \quad (8)$$

where $\phi$ and $\omega$ are the two polynomials for the AR and MA components in Equation (8), $\Phi$ and $\Omega$ are the two polynomials for the seasonal components.

The system for the demand prediction of FIGS. 1 and 2 combine a baseline history analysis (e.g. harmonic analysis generating a Fourier model) with a predictor function (e.g. SVR or another regression function, or ARIMA or SARIMA) in order to provide more accurate prediction over various time horizons and time series data sets. In general, such a combination can be in a parallel mode in which outcomes of individual predictors are combined through a weighted voting scheme, or (as illustrated in FIGS. 1 and 2) in a serial mode in which outputs of one predictors (the harmonic predictor in illustrative FIGS. 1 and 2) are input to the "downstream" predictor function 34.

In the following, some actually performed simulations are described. In these simulations, SVR is used as the last stage predictor (e.g. as trained predictor function 34), due to its capability to integrate multiple information sources. Predictions of auto-regressive and spectral (harmonic) methods are used as input observations for SVR (e.g., the output of the Fourier model 22). More generally, however, it is to be understood that the predictors in the serial combination may be neural networks, regression trees, k-nearest neighbors, Gaussian processes, or so forth.

The following the protocol was used in performing the experiments. Two standard measures of errors were used, namely Mean Square Error (MSE) and Mean Average Percentage Error (MAPE), defined as:

$$E_{MAPE} = \frac{1}{n}\sum_{i=1}^{n}\left|\frac{y_i - \hat{y}_i}{y_i}\right|, \quad (9)$$

$$E_{MSE} = \frac{1}{n}\sum_{i=1}^{n}(y_i - \hat{y}_i)^2,$$

where $y_i$ is the true value at time t in the test set while $\hat{y}_i$ is the prediction.

For machine learning techniques the time-series data were sequentially split into training and test sets. However, this is not an ideal situation because of the different periodical trends present in the data. For instance, if the training set spans over a regular period and the test set incorporates a holiday season, this is likely to adversely affect the predictions since the test set follows a different distribution than the training set. In order to offset this problem and also to analyze how the learning and testing handles the potential differences, the percentage of data used as training set was varied—typically between 60% to 95% for each of the models. Performance of these models is then compared based on these error curves.

Models based on auto-regressive techniques are typically useful for short term predictions, especially if d>0, i.e. the model includes integration term I(d). The prediction error quickly accumulates since the predictions are made based on a fixed number of previous observations. For long-term predictions, training a single auto-regressive model may give poor performance because of the independence of these models from test sets. Parameters learned during the learning phase are not applied to a test set; but are applied, sequentially, to the training set and finally to new predictions made. For this reason, for auto-regressive models, several models were incrementally learned and predictions were made on small intervals. These predictions were then combined and performance measures calculated from these predictions based on several models instead of a single model.

Experiments were performed on off-street parking resource occupancy data gathered for parking facilities at the Toulouse Blagnac Airport in France (hereinafter "Blagnac"). The primary tracking mechanism 12 for collecting the occupancy data in the form of transactional data was hardware equipment which record different events such as entry and exit at Blagnac airport parkings. Transactional records on each vehicle entry and exit were transformed and aggregated into time sequences at a specific (fixed) duration time. Sequences were generated at 15 minutes, 30 minutes intervals as well as 1 hour intervals.

Figure 3:
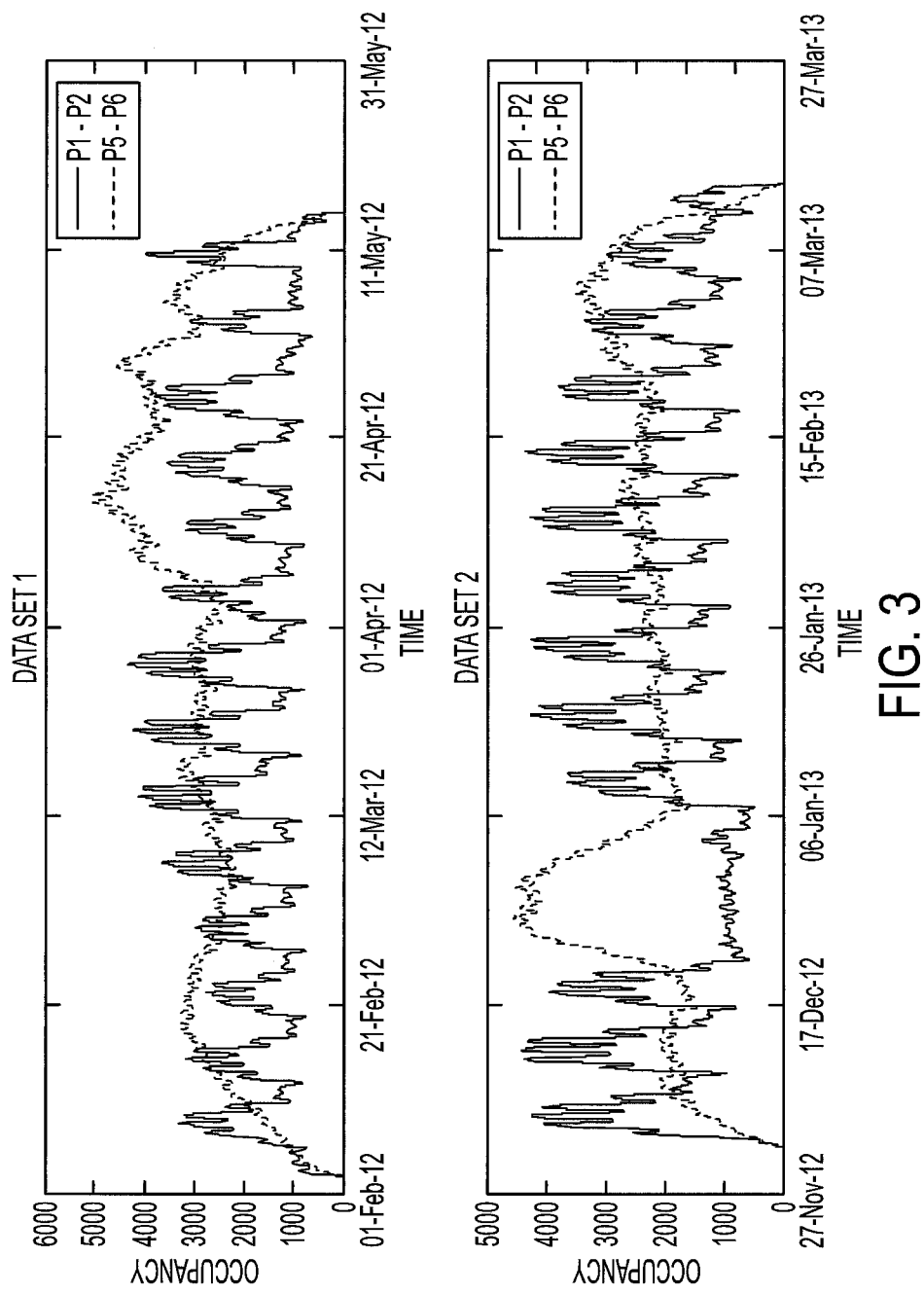
FIGS. 3-13 illustrate simulation/experimental results as described herein.

With reference to FIG. 2, two datasets were collected, covering periods from February 2012 to mid-May 2012, and from December 2012 to mid-March 2013. Each data set comprises data from five airport parking spaces. Parking P0 is considered of no interest since it is the drop lane at the airport and stationing of vehicles beyond 30 minutes is prohibited. Of the remaining four parking facilities, two pairs, each with similar pricing and location, were of primary interest for the analyses reported herein. Off-street parking resources P1 and P2 are designated as short-term parking facilities which are relatively closer to the airport terminals but are relatively more expensive. Off-street parking resources P5 and P6 are relatively further away from the terminals, but are also relatively cheaper and are designated as long-term parking. The collected hourly occupancy data for both types of parking and for both datasets are plotted in FIG. 3.

As previously noted, the occupancy data may be augmented by other relevant data, such as weather data in the illustrative examples of FIGS. 1 and 2. Weather conditions may have an impact on the parking occupancy, e.g. in poor weather it may be expected that closer (but higher priced) parking facilities may be preferred over more distant (albeit cheaper) parking facilities. Also, some of the parkings which are farther from the airport are open air, and it is necessary to take a bus to arrive at the terminals. Accordingly, the Blagnac dataset is augmented by collected historic hourly weather data corresponding to the occupancy data. Several parameters, such as temperature, wind-speed, windchill, precipitation and humidity are considered. These data correspond to some terms $v_{i,1}, \ldots, v_{i,m}$, of input data set $x_i=(y_i^H, v_{i,1}, \ldots, V_{i,m}, y_{i-k-\delta}, \ldots, y_{i-1-\delta})$.

Calendar information 24 corresponding to the occupancy data are also collected, such as the day of the week and whether there are holidays during a particular period. This is useful as the patterns followed by users of the parking facilities are expected to be are different on weekdays and weekends and during vacation periods. Information regarding the hour of day is also included as an input observation, i.e. as some of the terms $v_{i,1}, \ldots, v_{i,m}$.

In time series analysis, it is often the case that observing the last observations gives often a good idea for prediction the next value. If, for example, the occupancy during the last three hours has been increasing, it is likely to continue the trend. The occupancy at any given time is expected to be highly correlated with the most recent occupancy observations. The number of lags k which are helpful in predicting the occupancy may vary for different parking spaces due to the inherent differences in occupancy patterns of these parking spaces. In most experiments reported herein, the prediction models were built with lag k=3 or k=5. Additionally, a lag offset δ may be included so as to go beyond the most recent observations. Lag offsets of 24 hour, 48 hour and 168 hour were tested. This facilitates capture of cyclic behavior of occupancy. Time lags of 24 and 48 hours model the expectation that occupancy of parkings at the same hour of the day is similar across days. While this is likely to be true for some days, it might not be true in all cases; for instance, occupancy values are widely different between weekdays and weekends. In order to eradicate this, lag offsets of 168 hour were also tested, which corresponds to the parking occupancy one week ago on the same day of week.

Based on the foregoing approach, different prediction scenarios were tested. Models were trained for use in immediate prediction, i.e. assuming that at time i, the occupancy observations at time i−1, i−2, . . . are available, as well as all external characteristics. In other words, these immediate prediction models assume lag offset δ=0. In mid-term prediction scenarios, no immediate occupancy observation is available, and so some lag offset δ>0 is used. This reflects practical cases in which real-time data registered at various physical locations and devices take minutes, hours and even days to be collected and processed. Finally, in long-term prediction cases, the decision makers expect a demand estimation weeks and months in advance.

Figure 4:
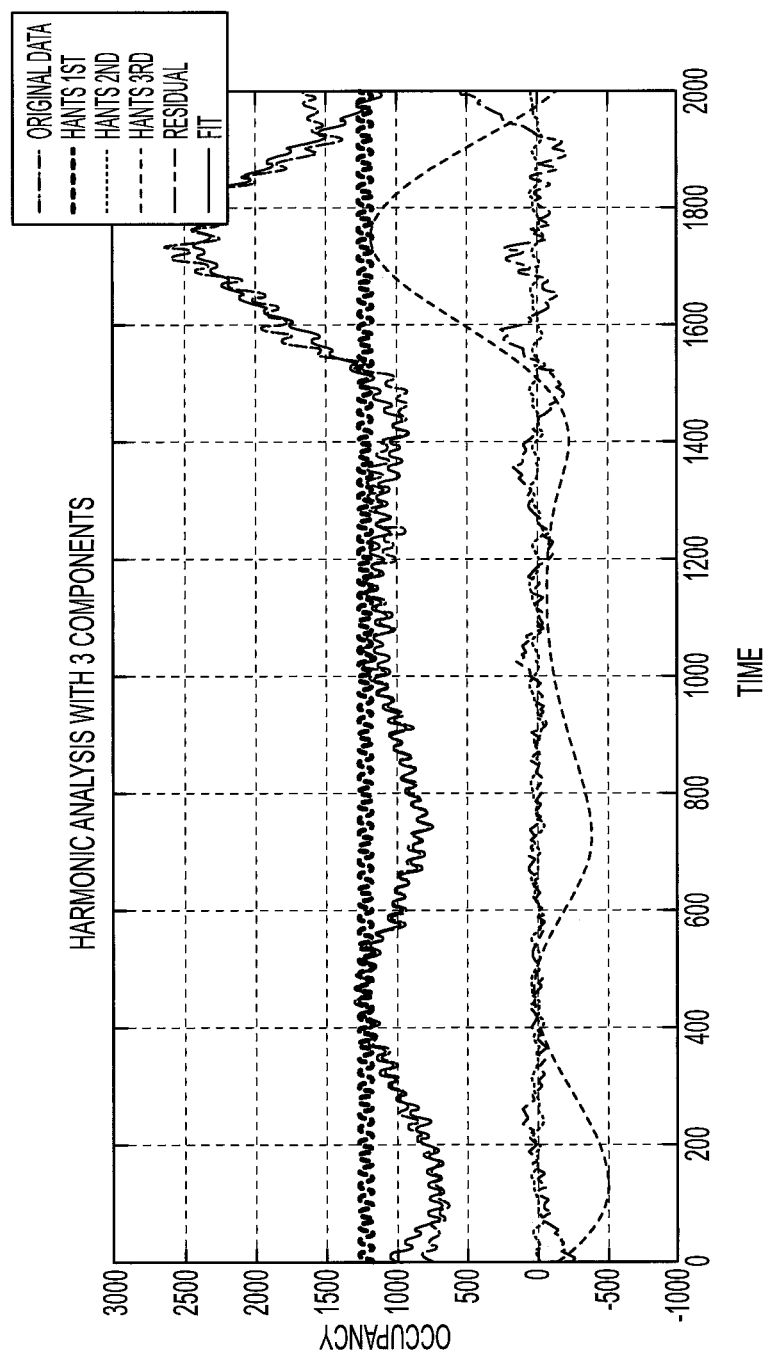

With reference to FIG. 4, the harmonic analysis module 20 processed the Blagnac data as follows. The Fourier components for a period of one day were first computed for the occupancy data 14. The resulting model was subtracted from the occupancy data 14 to generate residual data. The Fourier components for week and season (e.g. year) intervals were then computed for this residual data. The resulting harmonic analysis of the first Blagnac dataset is shown in FIG. 4, which plots the true occupancy data and the daily, weekly and seasonal cycles, along with how the sum of three cycles fits the read data, and the residual data.

Figure 5:
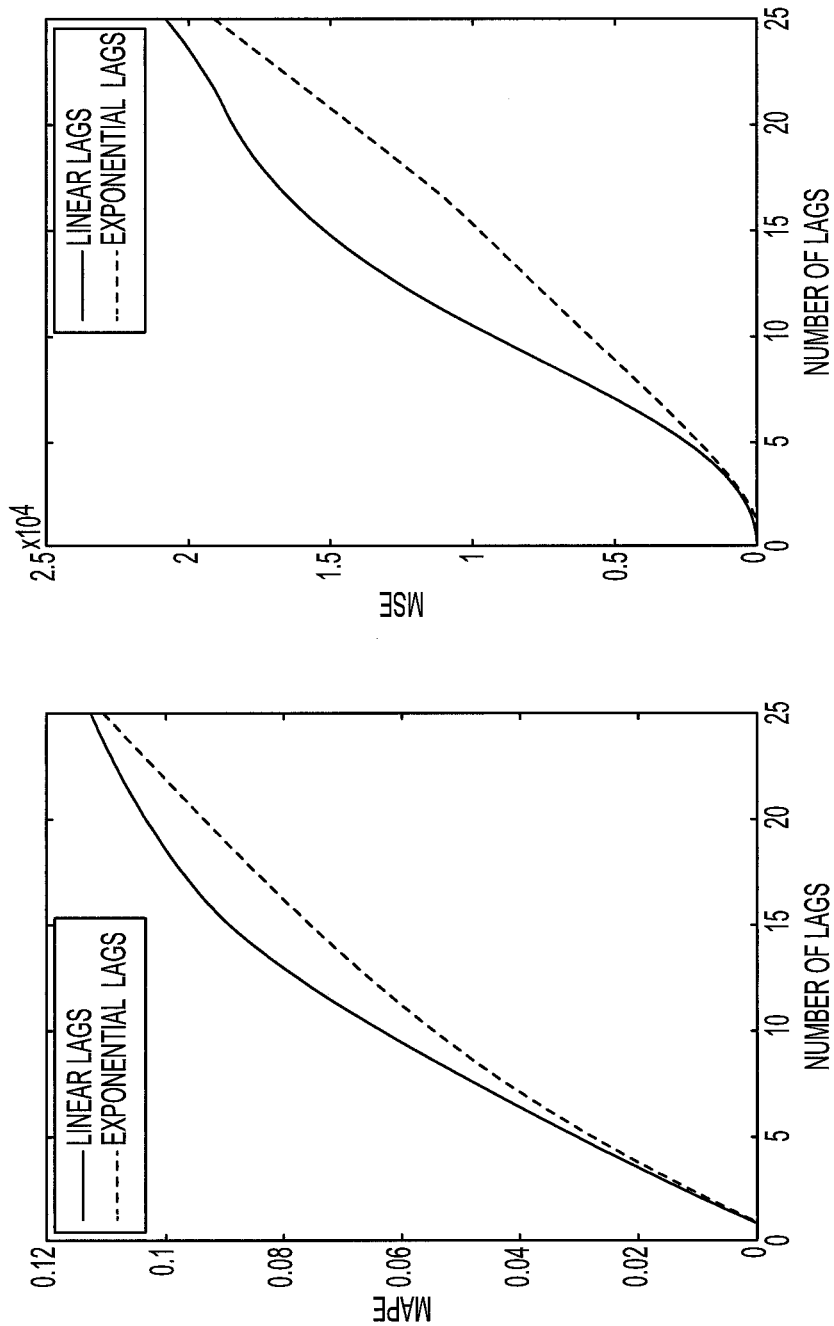

With reference to FIG. 5, in one set of experiments Moving Average (MA) models were considered. FIG. 5 shows the errors obtained for different lag values, using the auto-regressive protocol. It is observed that best results are achieved for the lag k=1. As can be seen from FIG. 5, the model with just one lag performs well with MAPE 0.97% for short term (ST) and 3.84% for long term (LT) parkings.

In further experiments, ARIMA models were learned using the auto-regressive protocol. Models were incrementally trained and used to make predictions over a short period of time. In this way, models are comparable to regression models whose results are also reported here. However, the ARIMA predictions are only reasonable for short periods of time (1-2 hours); for longer time periods, the ARIMA predictions deteriorate with large confidence intervals. Thus, for the Blagnac data set ARIMA is suitable for short-term prediction but not for longer term (e.g. greater than 1-2 hour) prediction horizons.

Figure 6:
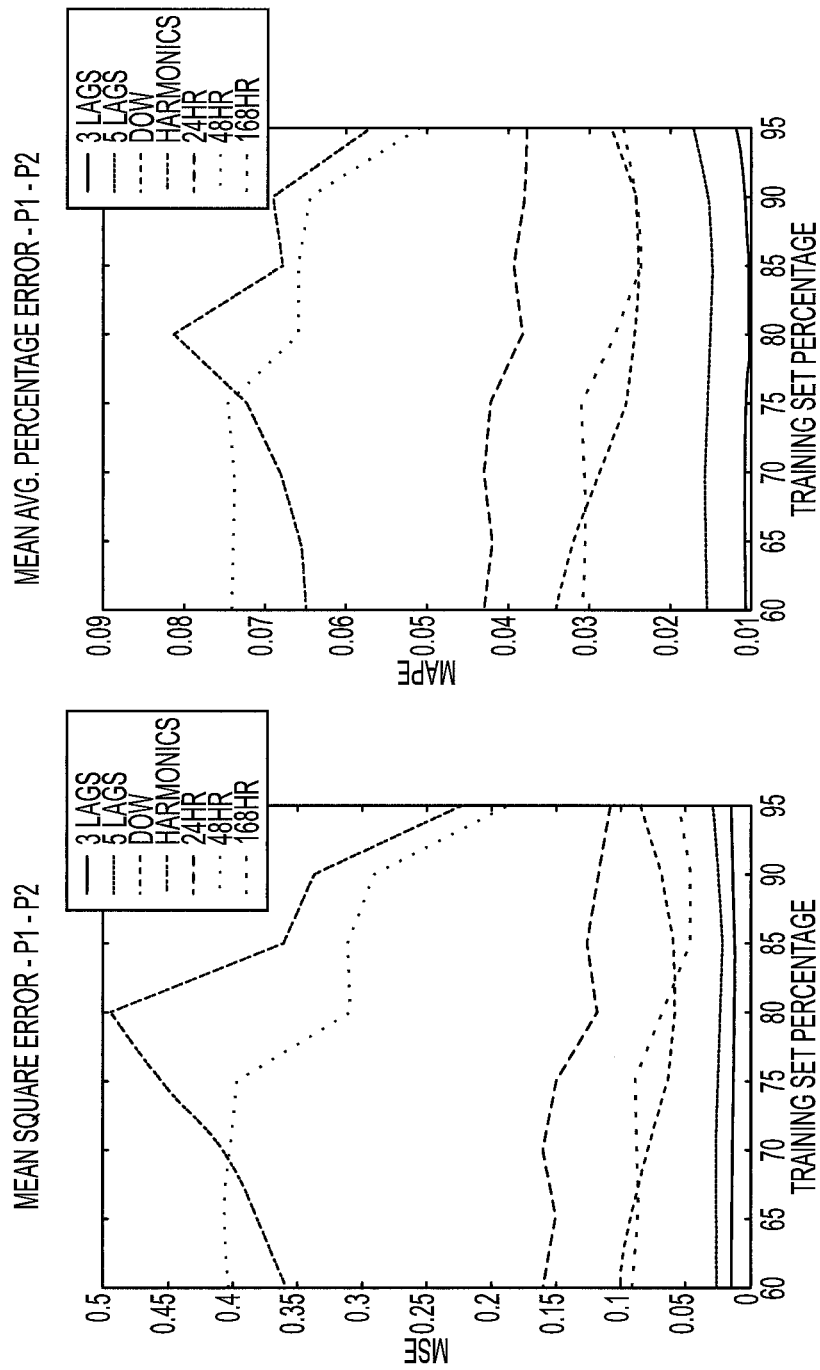
Figure 7:
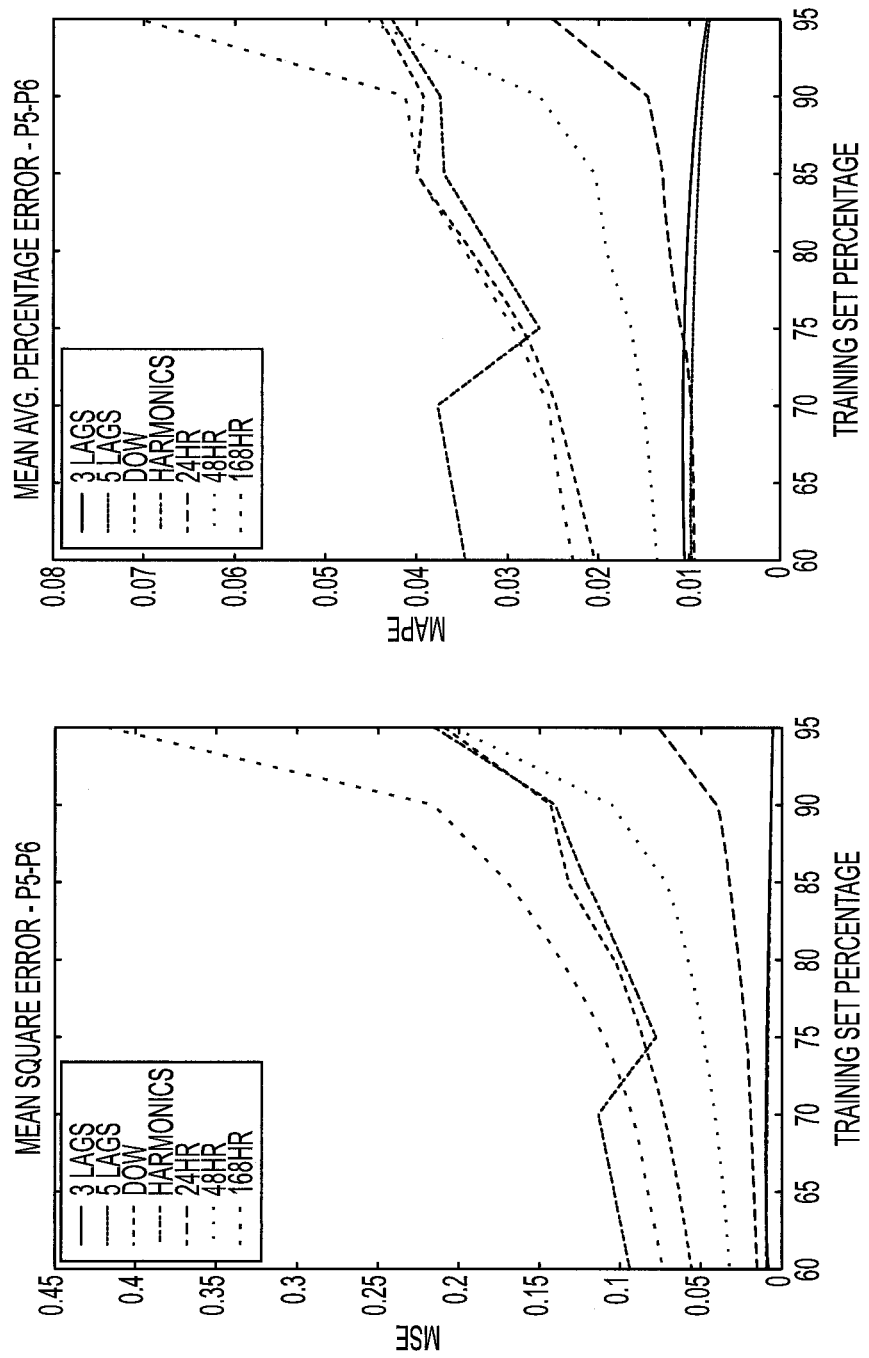

With reference to FIGS. 6 and 7, tests using SVR as the predictor function are reported. FIGS. 6 and 7 report MSE and MAPE values for SVR models trained with 3 lags, 5 lags, 24 Hr, 48 Hr and 168 Hr observations, as well as day-of-week and Harmonics features. Each curve plots the errors against the percentage of the data used as the test set, for both short-term (ST) and long-term (LT) parkings. Models trained with immediate occupancy observations yielded the most accurate predictions. Using lag k=5 performs better for LT parkings, while lag k=3 are sufficient for the case of ST parkings. MAPE values show that occupancy feedback is a suitable predictor with average prediction error just above 1% for ST parkings while it is marginally below 1% in case of LS parkings with lag k=5. Occupancy values from the past week (168 Hours), at the same time of the day is also a good predictor for ST parkings with low MSE and MAPE between 2.5-3.0% for all training set sizes. Observations of the day of the week (DOW) comprise seven mutually exclusive binary indicator variables representing the day of the week. The SVR also performs well for the DOW data, with similar error rates as the one week delay observations. For LT parkings, 24 hour and 48 hour lagged observations are better predictors than the Day-of-Week and 1-Week lagged observations. This suggests that ST parkings of the Blagnac data sets have a more regular pattern based on the day of week and daily trend which is independent of the occupancy status of the parking from previous days. By contrast, the LT parking data exhibits a more relative trend based on the occupancy over the past few days. This may reflect that ST parkings are mostly used for short parking stays, while LT parkings are used for longer trips.

Figure 8:
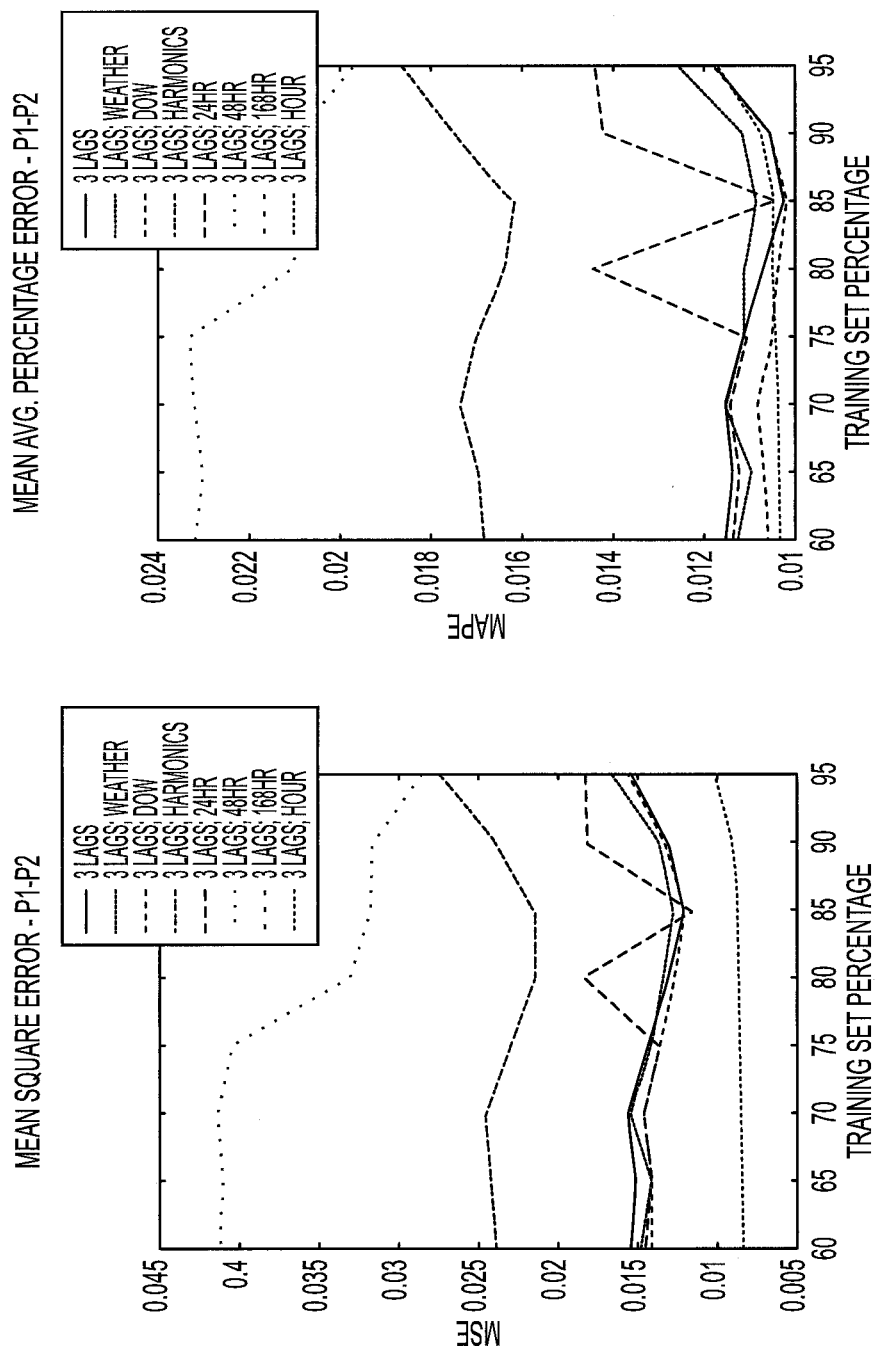
Figure 9:
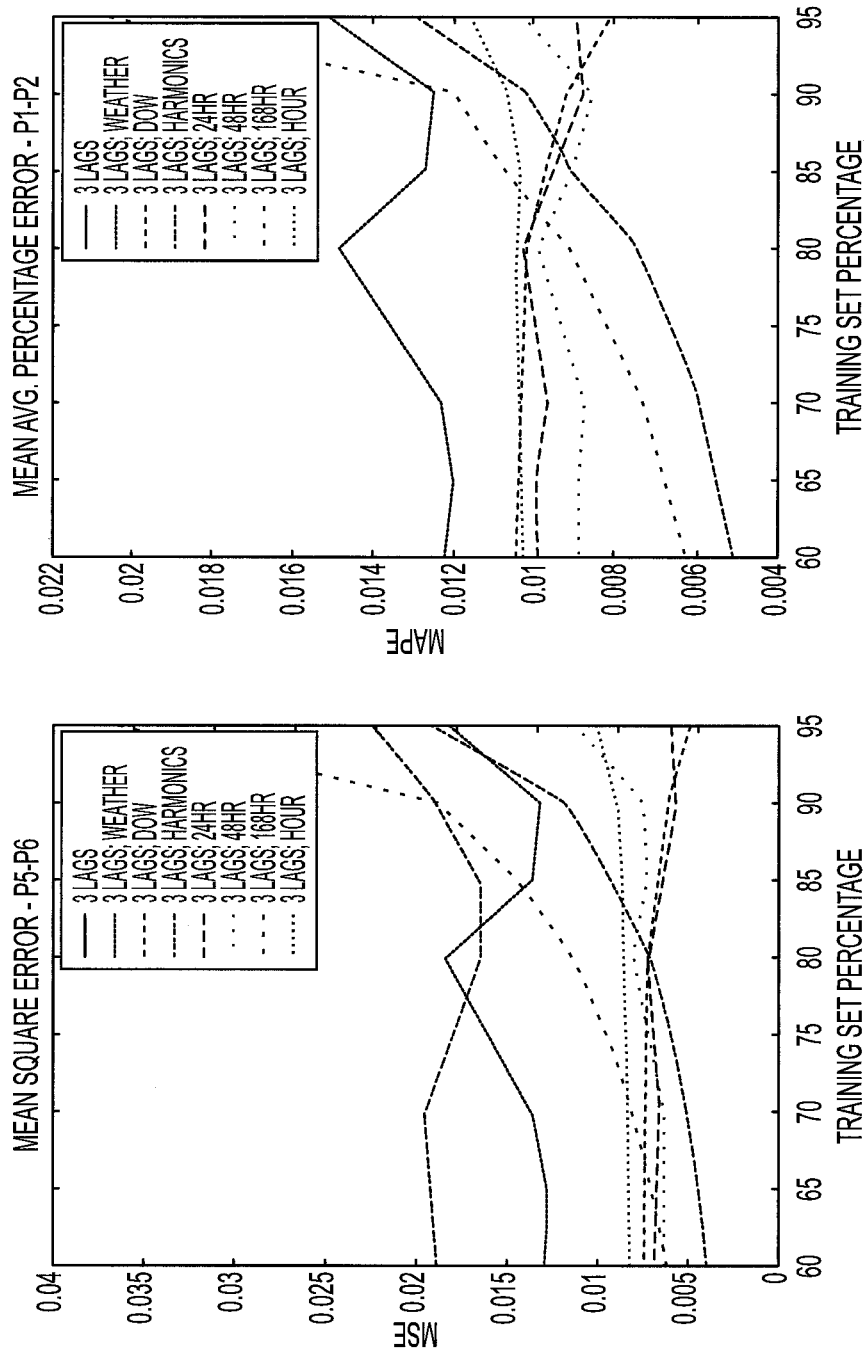

With reference to FIGS. 8 and 9, in another experiment, multiple characteristics and observations were combined to make an immediate prediction. Results for some of these combinations are plotted in FIGS. 8 and 9. As seen in these plots, extending the lag k=3 model with Hour-of-Day feature substantially reduces the MAPE for ST parkings. For the LT parkings, using the harmonics analysis or 48 Hr lagged observation reduces the error values, particularly when we dispose less training data (the training data percentage is inferior to 75%).

Figure 10:
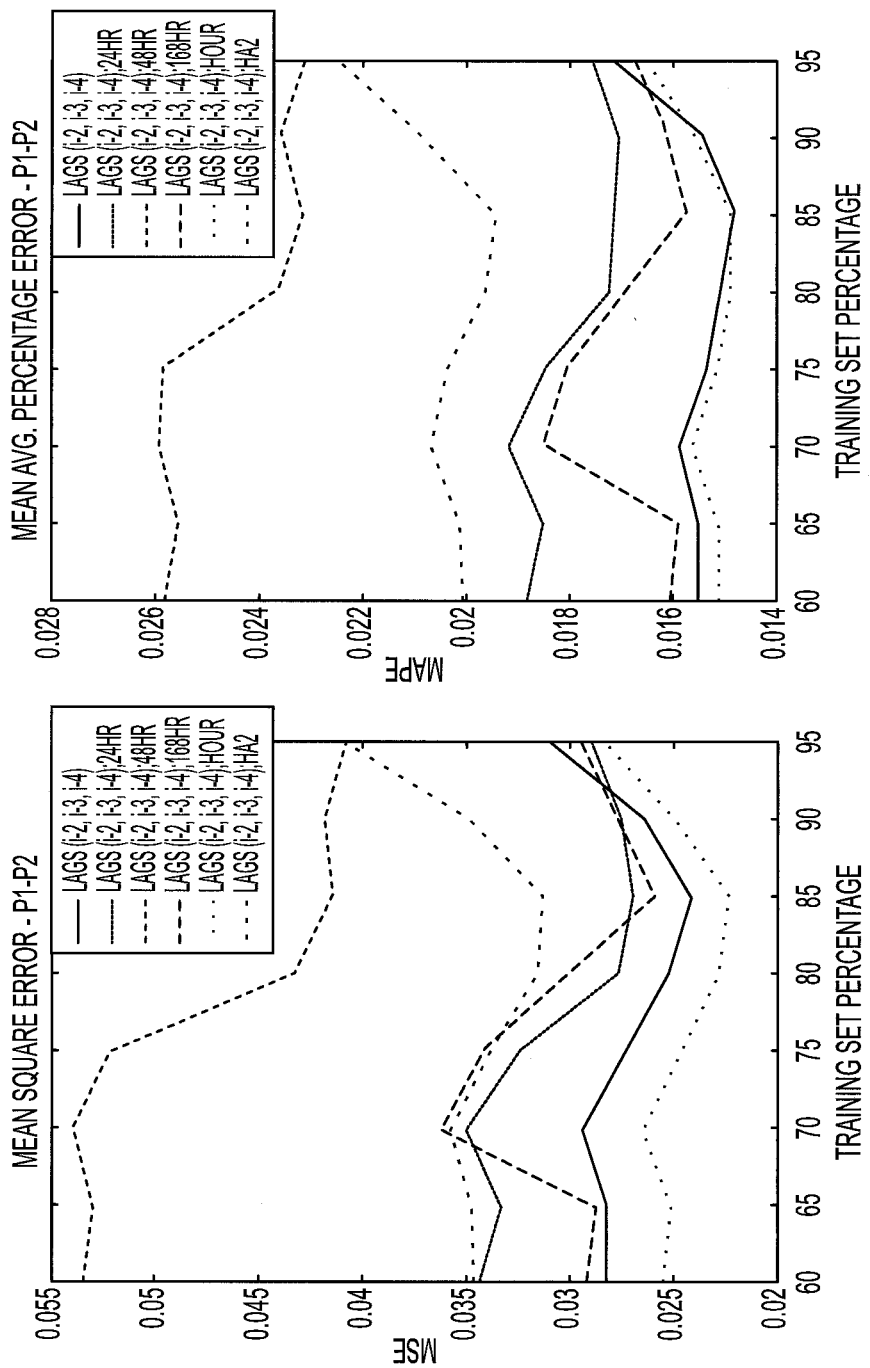
Figure 11:
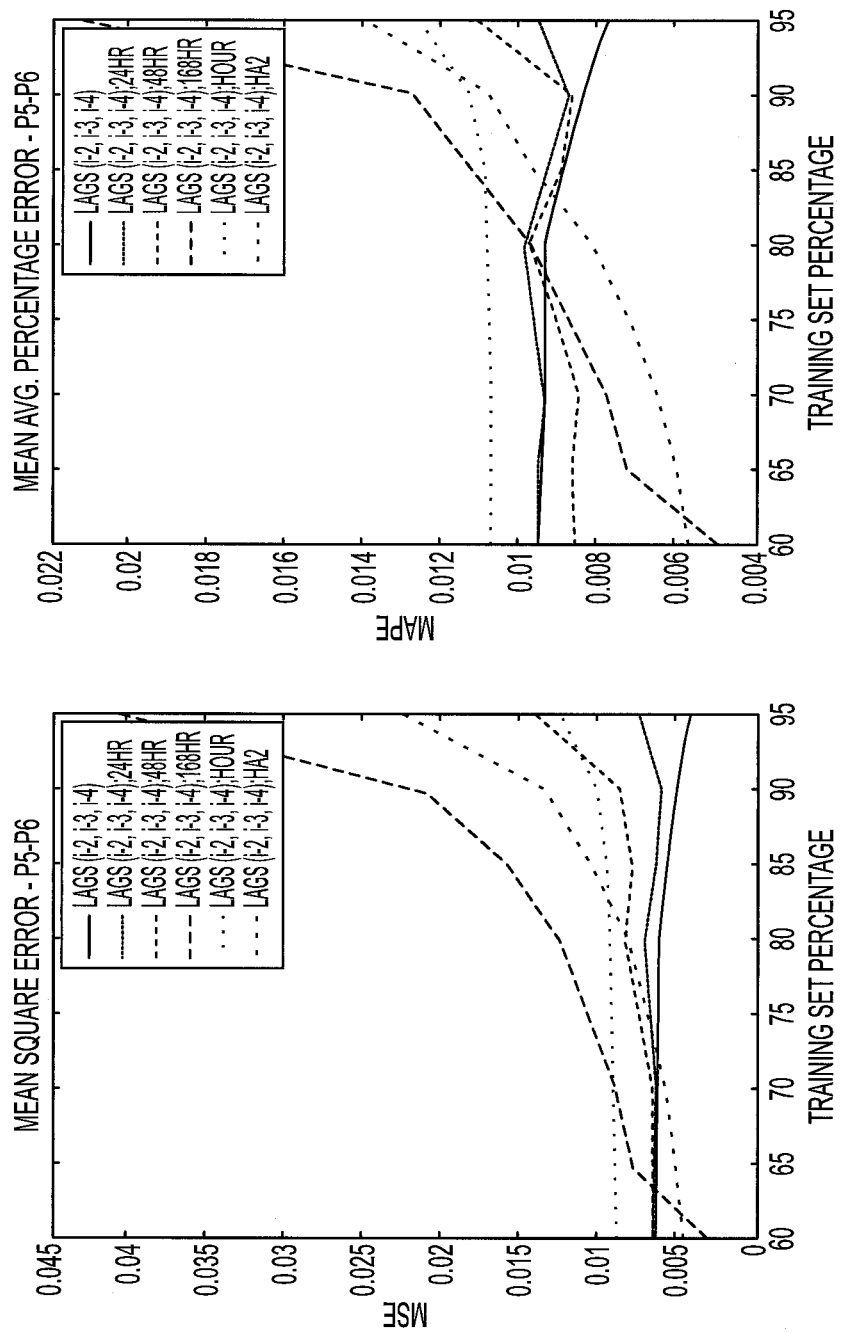

With reference to FIGS. 10 and 11, demand prediction on a mid-term horizon was tested for the Blagnac data sets. This scenario assumes a short delay in availability of occupancy data. In experiments, the latest data was assumed to be available with 1 or 2 hours of delay. Due to the delay, all models behave slightly worse in terms of prediction quality compared to the immediate case. FIG. 10 plots MSE and MAPE values for ST parkings, when the delay is one hour (corresponding to lag offset δ=1, that is, prediction for $y_i$ can observe values $y_{i-2}, y_{i-3}, \ldots$). The lag k=3 model performs well, and an improvement is obtained by combining k=3 it with the Hour-of-Day feature. FIG. 11 plots error values for LT parkings. It is seen that the delayed lags k=3 perform well, with further improvements achieved when combined with 1-Week lagged observation or with harmonic analysis.

Figure 12:
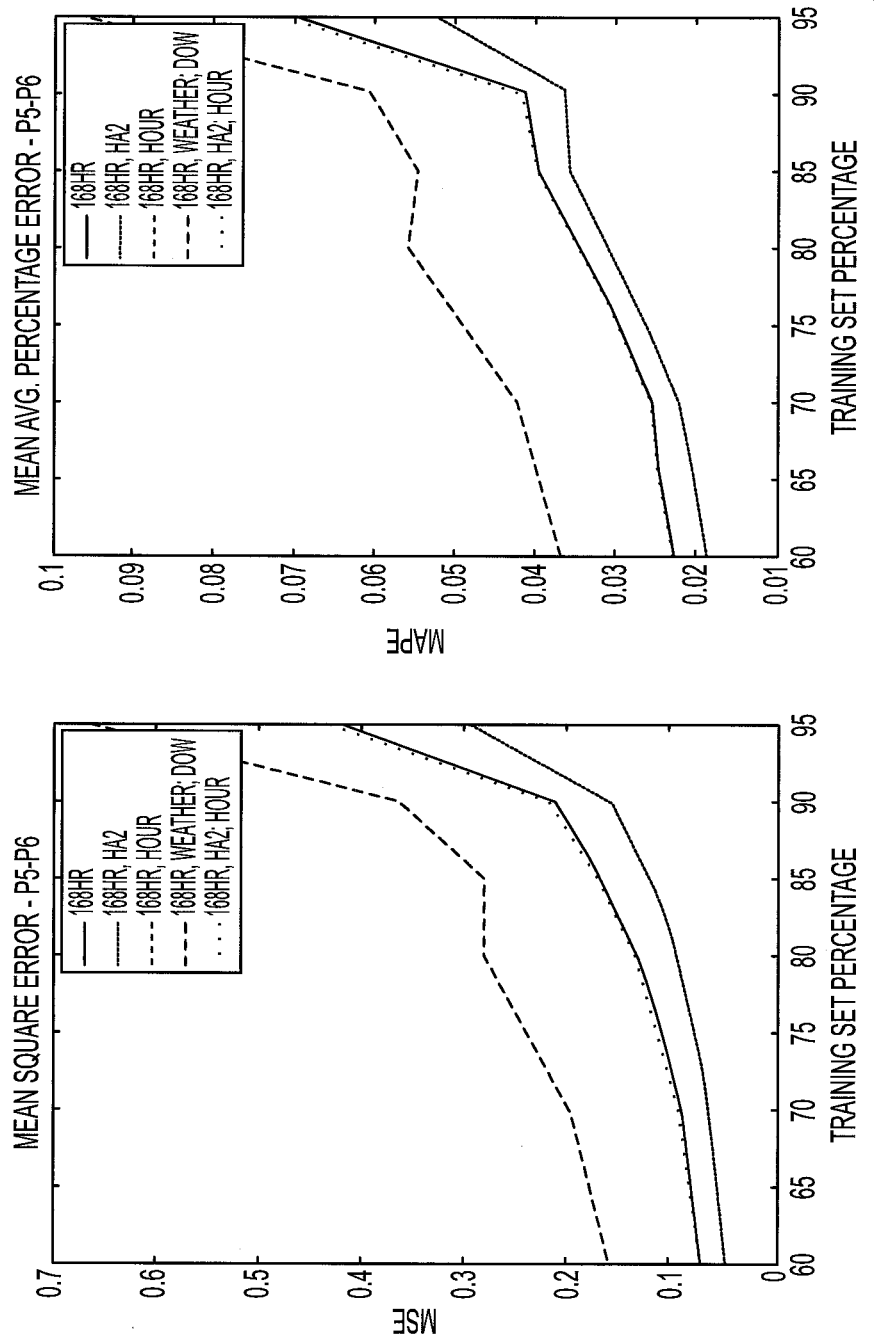

With reference to FIG. 12, demand prediction on a long-term horizon was tested for the Blagnac data sets. In this scenario, the current observations and features are used to make one week forecast. As FIG. 12 reports, the occupancy is predicted on this time horizon with about 2.5%-3.0% MAPE which can further be improved with the use of Harmonic Analysis to reach under 2% for most training set sizes.

Demand prediction techniques disclosed herein employ different combinations of base predictors. In the experiments on the Blagnac data sets, serial composition of harmonic analysis with SVR was found to perform well, including in long prediction scenarios. Other combinations, such as the weighted voting or a serial composition of ARIMA models and SVR, are also contemplated. Table 1 compares MAPE values for some of the previously tested models on Blagnac dataset, with and without input of ARIMA. No positive impact of using ARIMA models in the serial mode is observed.

TABLE 1

| Model | MAPE |
|---|---|
| 3 Lags | 0.010372 |
| 3 Lags; with ARIMA | 0.012218 |
| HA2; 24 Hr; 48 Hr | 0.020108 |
| HA2; 24 Hr; 48 Hr; with ARIMA | 0.016881 |

Figure 13:
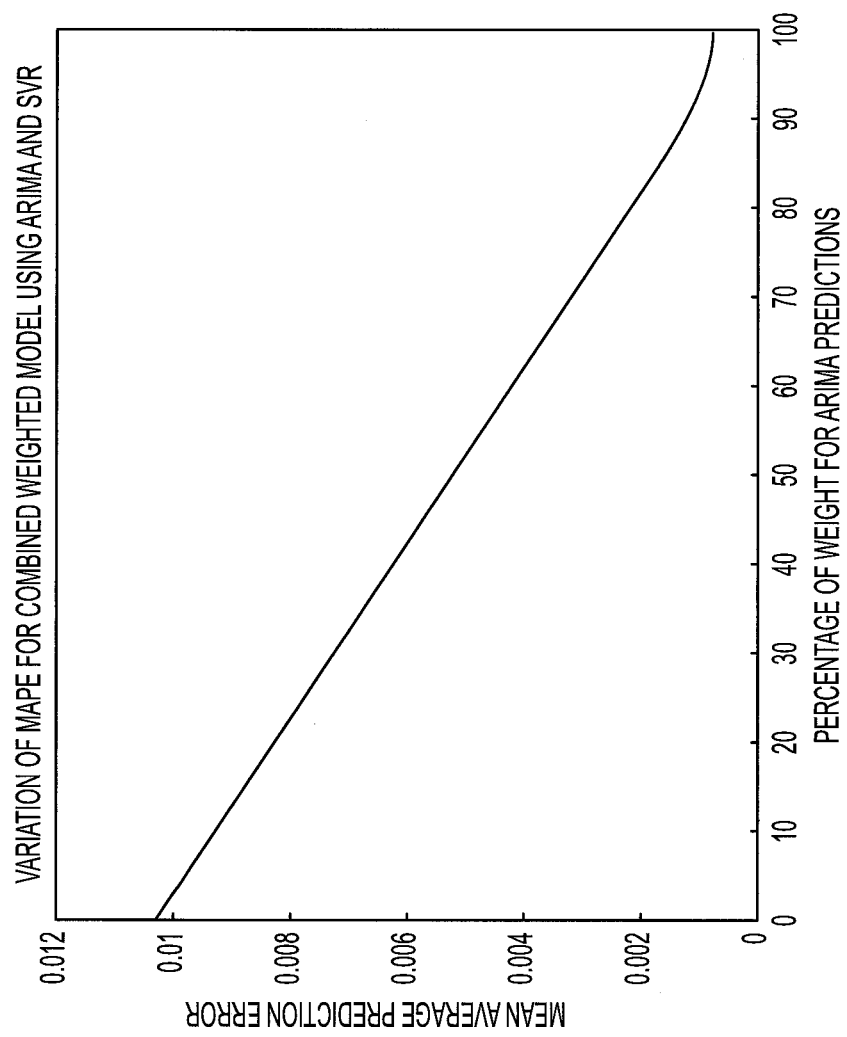

With reference to FIG. 13, another experiment was performed, which used a weighted voting schema on predictions of previously discussed models. It used a linear combination of predictions from ARIMA and SVR models, which can be represented formally as $\hat{y}_{hybrid}=\alpha \text{yarima}+(1-\alpha)y_{svr}$. However, in this case, SVR model always performs better and the combination did not exhibit any advantages over the SVR model. FIG. 13 plots the MAPE when the weight for ARIMA model is varied between 0.01 and 0.99.

The evaluation tests on Blagnac off-street parking dataset demonstrated efficacy of the demand prediction methods disclosed herein for various practical scenarios. In the case of immediate prediction, ARIMA and SVR both perform well, with SVR being more flexible in integrating multiple sources and requiring less re-training than ARIMA. For long-term prediction, spectral models effectively capture multiple cyclic trends in data. In mid-term scenarios, SVR is robust against data collection delay (i.e. lag offset δ), and facilitates integrating predictions of other models as the downstream predictor function of a serial combination.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A non-transitory storage medium storing instructions readable and executable by an electronic data processing device to perform a method comprising:
    generating a Fourier model of history of demand for a resource comprising time series data;
    estimating demand for the resource at a prediction time by evaluating the Fourier model at the prediction time; and
    generating a prediction of demand for the resource at the prediction time by evaluating a regression function operating on an input data set including at least the estimated demand for the resource at the prediction time estimated by evaluating the Fourier model at the prediction time and measured values of demand for the resource measured at one or more times prior to the prediction time.

2. The non-transitory storage medium of claim 1 wherein the resource is one of: off-street parking, electrical power, gasoline, and a retail merchandise product.

3. The non-transitory storage medium of claim 1 wherein the resource is off-street parking and the input data set further includes weather data measured at the one or more times prior to the prediction time.

4. The non-transitory storage medium of claim 1 wherein the regression function comprises a support vector regression (SVR) function trained on the history of the demand.

5. The non-transitory storage medium of claim 1 wherein the method further comprises:
    training the regression function on the history of the demand.

6. The non-transitory storage medium of claim 1 wherein the generating of the Fourier model comprises computing Fourier components for a plurality of different periods including at least two of (1) one day, (2) one week, and (3) one year.

7. The non-transitory storage medium of claim 1 wherein the generating of the Fourier model comprises computing a Fourier transform of the history of the demand.

8. An apparatus comprising:
    an electronic data processing device configured to receive occupancy data from an off-street parking resource, the electronic data processing device further configured to:
        estimate demand for the off-street parking resource at a prediction time based on a Fourier model of historical occupancy data received from the off-street parking resource; and
        generate a predicted demand for the off-street parking resource at a prediction time by evaluating a regression function operating on an input data set including at least the estimated demand for the off-street parking resource at the prediction time estimated based on the Fourier model and occupancy data received from the off-street parking resource at k times prior to the prediction time.

9. The apparatus of claim 8 wherein the input data set further includes weather data measured at the k times prior to the prediction time.

10. The apparatus of claim 8 wherein the regression function comprises a support vector regression (SVR) function trained on the historical occupancy data.

11. The apparatus of claim 8 wherein the electronic data processing device is further configured to generate the Fourier model of the historical occupancy data.

12. The apparatus of claim 11 wherein the electronic data processing device is configured to generate the Fourier model of the historical occupancy data by operations including computing a Fourier component for a time interval of one day and computing a Fourier component for a time interval of one week.

13. The apparatus of claim 11 wherein the electronic data processing device is configured to generate the Fourier model of the historical occupancy data by computing a Fourier transform of the historical occupancy data.

14. The apparatus of claim 8 wherein the electronic data processing device is further configured to train the regression function on the historical occupancy data.

15. A method comprising:
    modeling a history of demand for a resource to generate a baseline model of the demand;

predicting demand for the resource at a prediction time by evaluating a regression function of depth k operating on an input data set including at least the demand for the resource at the prediction time output by the baseline model of the demand and measured demand for the resource measured at k times prior to the prediction time, where k is a positive integer greater than or equal to one;

wherein the modeling and the predicting are performed by an electronic data processing device.

16. The method of claim 15 wherein k is greater than or equal to two.

17. The method of claim 15 wherein the resource is off-street parking and the input data set further includes weather data measured at the one or more times prior to the prediction time.

18. The method of claim 15 further comprising:
training the regression function on the history of demand for the resource, wherein the training is performed by the electronic data processing device and utilizes the baseline model of the demand.

19. The method of claim 18 wherein the regression function comprises a support vector regression (SVR) function.

20. The method of claim 15 wherein the baseline model comprises a Fourier model and modeling comprises:
computing Fourier components of the history of demand for the resource.

* * * * *